United States Patent
Hecht et al.

(10) Patent No.: US 6,993,655 B1
(45) Date of Patent: Jan. 31, 2006

(54) RECORD AND RELATED METHOD FOR STORING ENCODED INFORMATION USING OVERT CODE CHARACTERISTICS TO IDENTIFY COVERT CODE CHARACTERISTICS

(75) Inventors: David L. Hecht, Palo Alto, CA (US); John Lennon, Newark, CA (US); Ralph Merkle, Sunnyvale, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/467,509

(22) Filed: Dec. 20, 1999

(51) Int. Cl.
 *H04L 9/00* (2006.01)
 *G06K 7/10* (2006.01)
 *G06K 19/06* (2006.01)
 *G06K 9/00* (2006.01)

(52) U.S. Cl. .................. 713/176; 235/468; 235/491; 235/494; 382/100

(58) Field of Classification Search ............ 735/494, 735/454, 455, 456; 283/93, 70; 382/100; 235/494, 468, 491; 713/176
See application file for complete search history.

(56) References Cited

U.S. PATENT DOCUMENTS

| | | | |
|---|---|---|---|
| 4,461,668 A * | 7/1984 | Samuelsen | 156/543 |
| 4,761,668 A * | 8/1988 | Parker et al. | 399/232 |
| 4,943,239 A * | 7/1990 | Koslin | 434/353 |
| 5,128,525 A * | 7/1992 | Stearns et al. | 235/454 |
| 5,168,147 A * | 12/1992 | Bloomberg | 235/456 |
| 5,221,833 A | 6/1993 | Hecht | |
| 5,225,900 A * | 7/1993 | Wright | 358/501 |
| 5,315,098 A | 5/1994 | Tow | |
| 5,337,361 A | 8/1994 | Wang et al. | |
| 5,449,896 A * | 9/1995 | Hecht et al. | 235/494 |
| 5,453,605 A * | 9/1995 | Hecht et al. | 235/494 |
| 5,521,372 A * | 5/1996 | Hecht et al. | 235/494 |
| 5,565,669 A | 10/1996 | Liu | |
| 5,576,532 A * | 11/1996 | Hecht | 235/494 |
| 5,611,575 A * | 3/1997 | Petrie | 283/67 |
| 5,771,245 A * | 6/1998 | Zhang | 714/762 |
| 5,895,073 A * | 4/1999 | Moore | 283/70 |
| 5,951,055 A * | 9/1999 | Mowry, Jr. | 283/93 |
| 6,000,613 A * | 12/1999 | Hecht et al. | 235/456 |
| 6,182,901 B1 * | 2/2001 | Hecht et al. | 235/494 |
| 6,256,398 B1 * | 7/2001 | Chang | 382/100 |
| 6,427,920 B1 * | 8/2002 | Bloomberg et al. | 235/494 |
| 6,457,651 B2 * | 10/2002 | Paul et al. | 235/494 |
| 6,577,748 B2 * | 6/2003 | Chang | 382/100 |
| 6,663,008 B1 * | 12/2003 | Pettersson et al. | 235/494 |
| 6,728,390 B2 * | 4/2004 | Rhoads et al. | 382/100 |
| 6,744,906 B2 * | 6/2004 | Rhoads et al. | 382/100 |

FOREIGN PATENT DOCUMENTS

| | | |
|---|---|---|
| WO | WO 00/73981 A1 | 12/2000 |
| WO | WO 01/01670 A1 | 1/2001 |

\* cited by examiner

*Primary Examiner*—Ayaz Sheikh
*Assistant Examiner*—Christian La Forgia

(57) ABSTRACT

A record and related method is provided for storing encoded information comprising a storage media, first marks on the storage media having a covert code characteristic, with the first marks conveying a covertly marked code and second marks preferably having an overt code characteristic which convey a second overtly marked code useful in decoding the covertly marked code.

30 Claims, 4 Drawing Sheets

RECORD AND RELATED METHOD FOR STORING ENCODED INFORMATION USING OVERT CODE CHARACTERISTICS TO IDENTIFY COVERT CODE CHARACTERISTICS

BACKGROUND OF THE INVENTION

This invention relates to self-clocking glyph codes for recording digital information on graphic recording media, such as plain paper. Even more specifically, this invention pertains to techniques for increasing the security of the digital information while preserving the homogenous visible appearance of the resultant product.

Distinguishing copies or counterfeits of original authentic documents is a common important objective. Printing documents with features that are difficult to copy or counterfeit is one general approach to counterfeit suppression. Excellent advanced image copying technology, however, makes it more difficult to print image characteristics that are adequately copy-proof. Special physical printing, such as holograms, can be employed. However, this approach requires special printing equipment and may be counterfeited if that equipment is accessible to the counterfeiter.

Covert chemical taggants are known and have been incorporated into print material such as paper and/or toner. However, counterfeits could be made if the materials making up the chemical taggants could be obtained and applied in the required pattern. Such copying is facilitated if the taggants occur in a distinguishable manner, that is, if the taggants are visually detectable or capable of being detected by optical machine, such as is the case when using tagged yellow toner as a taggant.

Robust self-clocking glyph codes are known. Such codes can generally encode arbitrary digital message codes up to a certain capacity, typically several hundred bytes per square inch. Glyph codes typically comprise distinguishable rotated marks; for example, 3,600 such marks per square inch may form a rectangular lattice. These glyph codes can include encrypted messages, including digital signatures such as those used in secure electronic communications. However, conventionally printed glyph codes are readily copyable, thereby reproducing their information content. Simply printing glyph codes with a taggant material can be counterfeited if the taggant material can be obtained.

Accordingly, an object of the present invention is to provide a record and related method for encoding information which cannot easily be copied or otherwise counterfeited.

SUMMARY OF THE INVENTION

In accordance with the present invention, a record for marking encoded information is provided comprising a marking medium, such as plain paper; first marks on the storage marking medium having a covert code characteristic, these first marks conveying a first message, which may be encrypted; and second marks on the marking medium, which second marks convey an overtly marked code which, when decoded, produces data for use in detecting and decoding the first message. In one embodiment, the second marks have an overt code characteristic, whereas the covert code characteristic of the first marks is visually undetectable. Additionally, the covert code characteristic of the first marks does not affect the appearance of the first or second marks. Also, both the first and second marks comprise glyphs, with the first marks having an additional covert code characteristic, such as a chemical taggant.

In another embodiment, the first marks have a covert code characteristic provided by chemical taggants and are divided into first and second sets of marks. Only the second set of marks conveys an authentication code pattern whose checking is aided by the message in the overtly marked encrypted code. By way of example, the covertly marked code may comprise authentication data and further by way of example, the overtly marked code may identify the location and logical order of the first set of marks conveying the covertly marked code, which may be encrypted.

It should further be understood that the first and second marks may, at least in part, comprise the same marks. For example, a glyph having a visibly undetectable code characteristic, such as would be provided by a chemical taggant, may also have a visible detectable overt code characteristic as could be provided, for example, by the orientation of a glyph. Thus, that same glyph may function to provide part of both the covert and the overtly marked code.

Of course, it should further be understood that the record of the subject invention may very well, and likely does, include third marks that do not participate in the function of the first and second marks, but which do participate in the storage of at least a portion of the encoded information to be carried by the record.

The invention further comprises a related method for storing encoded information on a storage media, generally comprising the steps of: placing the first marks on the storage media, with the first marks conveying a covertly marked code and placing second marks on the storage media adapted to convey an overtly marked code useful in decoding the covertly marked code, wherein the second marks have an overt code characteristic.

BRIEF DESCRIPTION OF THE DRAWINGS

Still further objects and advantages of this invention will become apparent when the following detailed description is read in conjunction with the attached drawings, in which.

DETAILED DESCRIPTION OF THE ILLUSTRATED EMBODIMENTS

While the invention is described in some detail herein below with reference to certain illustrated embodiments, it is to be understood that there is no intent to limit the invention to those disclosed embodiments. On the contrary, the intent is to cover all modifications, alterations, and equivalents falling within the spirit and scope of the invention as defined by the appended claims.

As noted above, this invention is directed towards applications and related methods for imprinting on documents dual characteristic covert glyph codes that are very difficult to reproduce or counterfeit. One overt characteristic, such as glyph rotation, is used to encode an overtly marked code that specifies a second covert state characteristic of some or all of the glyphs. The covert characteristic is preferably difficult to detect or copy on a glyph-by-glyph basis and preferably has negligible effect on the appearance of the glyph in the original document. An example of a covert characteristic is the presence of distinguishable chemical taggants of one or both of two marking materials with indistinguishable visual and photocopy characteristics, as could be obtained, for example, from two chemically different black toners.

Figure 1:
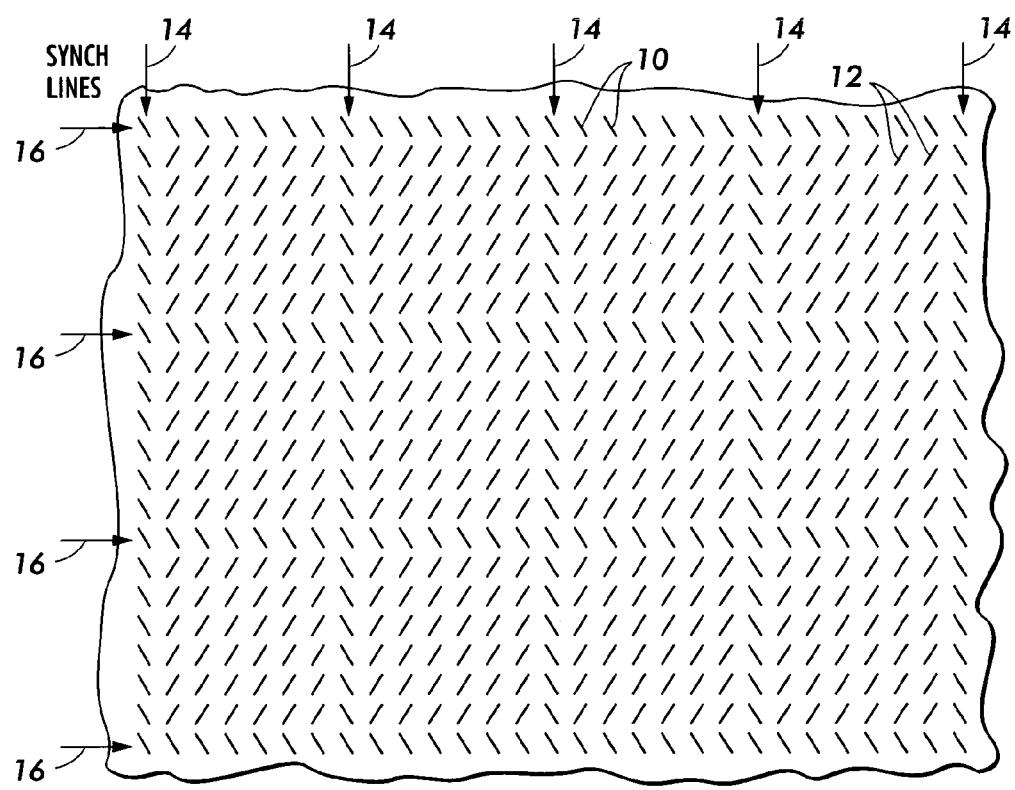
FIG. 1 illustrates a self-clocking glyph code pattern, with the glyphs overtly encoded by the rotational position of a slash-mark glyph character for encoding the overtly marked code.

In one embodiment, self-clocking glyphs are combined with encrypted messages in overtly marked codes to provide robust and secure identification of covertly marked codes. The overtly marked codes may or may not be encrypted. One example of a self-clocking glyph with rotational overt coding is shown in FIG. 1. As may be seen in FIG. 1 for purposes of clarity, a sync code encoded by predefined glyphs is shown in a "0" glyph state, that is, with the slash of a glyph rotated from upper left to lower right, and variable data glyphs are shown FIG. 1 in "1" glyph state, that is, the rotation of the slash is from upper right to lower left. As shown in FIG. 1, therefore, "0" state glyphs 10 thus form vertical sync lines 14 and horizontal sync lines 16 that provide a rectangular border to a plurality of "1" state glyphs 12, as is conventional in the art. A typical glyph code embodiment has mixed patterns of 1's an 0's in both data and sync codes, thus providing a random-like appearance. It should also be understood, as used herein, the "0" and "1" state of a visible glyph is merely one example of an overt code characteristic that may be used in accordance with the present invention. Other visible modifications, such as glyph shape or glyph orientation, may be employed, as should be understood by those skilled in the art. The covert mark may be one of many types, such as a chemically or physically detectable taggant.

Figure 2:
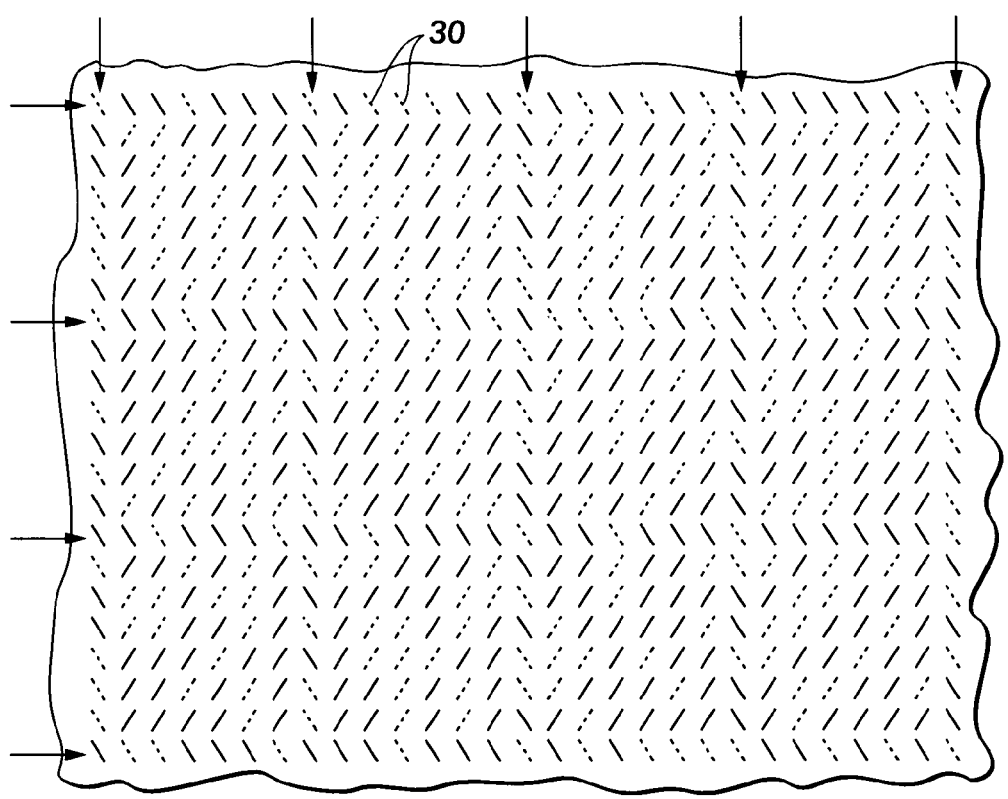
FIG. 2 illustrates by dashed marked glyphs which are marked distinguishably by the covert marking characteristic and convey an overtly marked code useful in decoding the covertly marked code, which may be encrypted, referenced with respect to FIG. 3.

In accordance with the present invention, second marks are provided on the media that convey an overtly marked code useful in decoding the covertly marked code. As shown in FIG. 2, for example, overt glyph markings are shown as having different rotations. The covert marked glyphs are in two states, denoted in FIG. 2 by solid line and dashed line glyphs (e.g., glyph 30). In one possible embodiment, the overt pattern of glyphs provides an identification of the location of covertly coded glyphs, or a subset of covertly coded glyphs that carry the covertly marked code and the authentic contents of that message; that is, the covert marking state of those glyphs.

Various coding methods that are known to those skilled in the art may be employed and, thus, there are many possible coding schemes for encoding the overt and covert codes employed in the subject invention. The overt glyph code can use, for example, any of the existing glyph code approaches including systems incorporated in commercial glyph encoding software, such as the Xerox DataGlyph™ Software Developer's Kit (SDK). Generally, for a pattern including N1 glyphs, a smaller number of user message glyphs N2 will be available. The difference between N1 and N2 is required due to overhead functions, such as synchronization, header or key codes, error correction protection, and spatial pattern filling. Typically, N1 may comprise 3600 glyphs per square inch of glyph coded print. Typically, N2 is greater than half of N1.

In one embodiment, the overtly marked code may be carried by N3 overt messaging bits, namely N3 clear text or visible messaging bits, N4 encrypted user message bits and N5 bits for desired error protection overhead. Thus, it is required that N2 be greater than or equal to N3+N4+N5. As was noted above, the overtly marked code carried by the N3+N4+N5 bits is used to specify the covert marking code pattern. In other words, this overtly marked code is used to specify which glyphs are marked in which covert state, thereby providing information that is useful in decoding and authenticating the covertly marked code. The covertly marked code may also be encrypted.

The N3 and N4 bits may thus be used to decode the overtly marked code, which in turn may comprise data from a trusted printing management system, individual print number, usage rights, print owner, digital signature, private message, financial transaction records, or the like, as well as information about the covert marked code. The covert marked code may also carry similar types of trusted printing information.

As referenced above, it is not necessary that all N4 bits carry the overtly marked code. It is instead possible that a smaller number, N6 be specified, while the remaining glyphs of N4 may be encoded pseudo randomly or arbitrarily. The same is true with respect to the glyphs having the covert code characteristics. Not all of the glyphs selected to bear covert code characteristics are necessarily required to convey the covertly marked code. It is desirable to force a potential counterfeiter to try to counterfeit the state of every glyph, both with respect to overt and covert code characteristics. Accordingly, it is desirable for every one of the N1 glyphs to be eligible for possible inclusion as bearing the covert and/or overtly marked codes. However, the number of glyphs actually carrying the covertly marked code should be large enough so that 1 in $2^{N6}$ random successful matches in counterfeiting attempts is acceptable where N6 is the number of glyphs actually carrying the covert marked code.

There are several examples of possible encoding using the N4 encrypted user message bits. The N4 bits may be used to explicitly define the identity (glyph pattern position) and state of the N6 glyphs bearing the covertly marked code. Generally, wherein N7 bits equals approximately $\log_2 N1$ bits for address, plus 1 bit for the state of a two state covert encoding. In general, for R state covert marked encoding, N7 equals $\log_2 N1 + \log_2 R$. Thus, N4 is greater than or equal to $N6 \times [1 + \log_2 N1] = N6 \times N7$

EXAMPLES

N1=638, N2=11, N6=16, N4=176(22 bytes), N5=168(14 bytes), N3=32(4 bytes), N2=320

N1=1024, N7=11, N6=8, N4=88(11 bytes), N5=32(40 bytes), N3=128(16 bytes), N2=536

N1=2048, N7=12, N6=10, N4=120 (15 bytes), N5=600 (75 bytes), N3=256 (32 bytes), N2=976

N1=4096, N7=13, N6=24, N4=312 (39 bytes), N5=1600 (200 bytes), N3=256 (32 bytes), N2=2168

N=4096, N7=13, N6=24, N4=1112 (139 bytes), N5=1600 (200 bytes), N3=256 (32 bytes), N2=2968

Alternatively, the N4 bits may indirectly identify the N6 glyphs by pointing to a reference or by providing an algorithm, which may use some or all of the quantities N1 and N6 as parameters.

The use of the approaches discussed above can be made most effective through appropriate selection and implementation of encryption and authenticity management protocols. Some desirable approaches which appear practical follow.

Referring to the coding methods discussed above, the encryption may implement an existing secret key encryption algorithm. The N3 overt clear text message bits may be used to specify the identify of secret encryption/decryption keys which are held by a secure server. The decoded message of the overtly encoded glyph code may be provided to the server along with sufficient authorization credentials of the user/entity/client testing the document. The server decrypts the encrypted code using the appropriate decryption key and returns information specifying which glyphs to test for covert encoding. The server may also hold, access and deliver to the client information required for successful testing; for example, taggant identity, chemical test procedure, optical test procedure to the authorized client, preferably using secure specifications specified by bits in the overtly marked code of size N3+N4+N5.

Security loss of the glyph test pattern will only compromise the specific document at issue. Security loss of the test method may only help an unauthorized party test other documents otherwise known to involve the same test procedure. However, the test glyph pattern of these other documents would not necessarily be compromised.

A similar overall approach may be developed to other coded mark systems than discussed above, provided they have sufficiently robust addressing (mark logical ordering) characteristics. Examples include checkerboard codes and encoded alphanumeric string codes.

Figure 3:
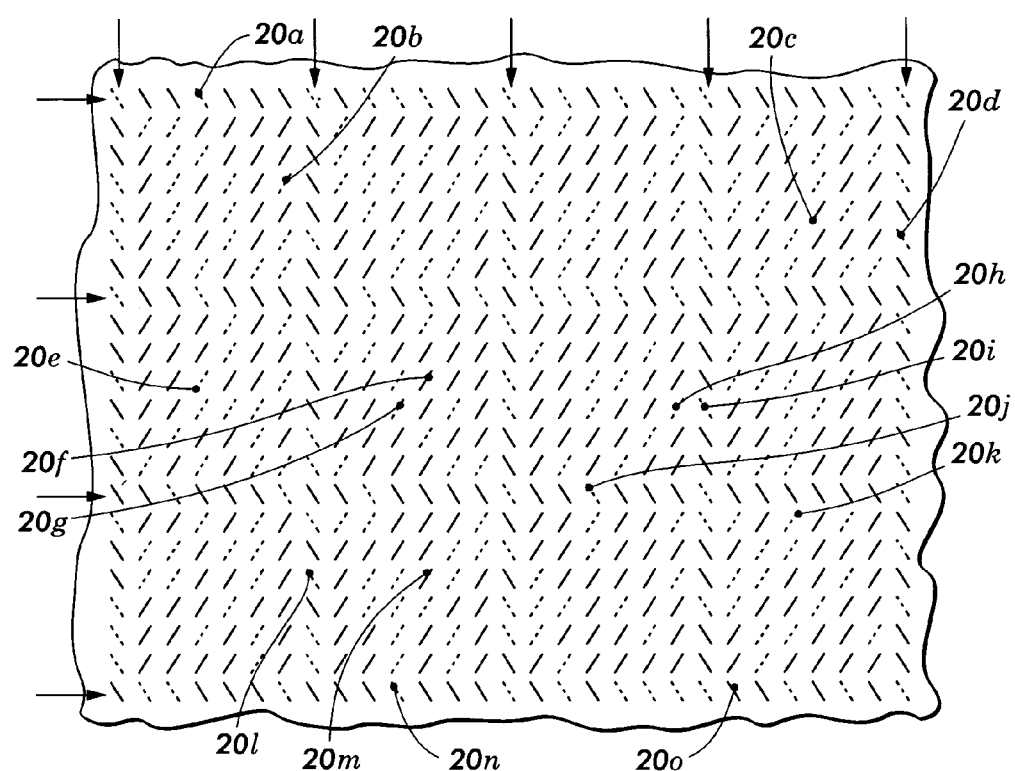
FIG. 3 illustrates by an additional dot a selected set of glyph marks bearing a covert code characteristic, which marks thereby convey an authentication pattern when information about the set and message are provided by the overtly marked code.

In accordance with the present invention, certain of the glyphs on the printed medium are selected to convey a covertly marked code, which may be encrypted. For example, as shown in FIG. 3, glyphs 20a through 20o are selected to carry a covert code pattern. The overtly marked code, such as the overt code shown in FIG. 1, provides information to identify the covert pattern glyphs and how to decode and/or verify them. For example, the information might include their pattern, covert marking state, logical order, or message.

Examples of covert code characteristics include image modulation, metamers, and visible twin materials. Covert image modulation may be obtained by small glyph translations, or small grey-scale modulations of glyphs by mark intensity or size, provided that such modulations and/or translations are sufficiently small to be difficult to detect or reproduce. Metamers may comprise combinations of marking materials with the same color appearance but different detailed spectral characteristics.

The use of a completely visibly indistinguishable material to provide a covert code characteristic is effective. One possible example is the use of materials with different infrared fluorescent or reflective characteristic. Another example is the use of materials with different ultraviolet fluorescent or reflectance characteristics, which may be resolvable only by a specially tailored filter or instrument. Small spectral differences can make such covert code characteristics difficult to be duplicated through counterfeiting.

One embodiment of covert code characteristic utilizes chemical distinction that requires a separate chemical test on each glyph, i.e., the use of taggants. One possible method of incorporating taggants is to make an atomic substitution of one or more of the components of a toner. An example may be to replace the hydrogen atom on a charge control agent "cetyl pyrridinium chloride." Substitution of the chlorine with bromide or iodine will cause a charge control agent change, which will most likely perform similar for all practical or visual purposes but in fact will be chemically different and can be so detected. A second desired characteristic for the authentication process will be met in that the print area containing this type of substituted material will be extremely small and difficult to locate or quantify except with highly specialized equipment. Electron dispersive x-ray analysis is capable of analyzing areas down to approximately one square micron for elementary compositions as low as 0.5%. The sensitivity of the technique is enhanced if the material is not homogeneously spread throughout the sample, but is located in clumps as is the case with some charge control agents that are surface active agents.

A still further possible example of covert code characteristics is the use of an isotropically enriched material such as chlorine-37 enriched CPC.

A still further example of a covert code characteristic is to incorporate a reactive chemical into the toner that forms the glyphs, which reactive chemical would combine with an applied solution of a second material to form a unique chemical product that would be quantified by a spectroscope or other comparable method.

Each of the above examples provides glyphs that are physically indistinguishable, but which provide additional information through the applied covert characteristic.

It should be understood that glyphs marked with a covert code characteristic should be printed with adequate relative registration so that such glyphs cannot be distinguished on the basis of a systematic spatial shift between the patterns of glyphs containing or not containing the covert characteristic or a pattern of glyphs containing two or more different states of the covert characteristic. Some printing technologies can provide excellent co-registration of printing of two marking materials. Tri-level xerography is one such example. Xerocolography may also enable effective co-registration of more than two covert marking characteristic materials. If the overt and covert characteristics are provided as part of the same marking process, registration may be straightforward. Misregistration may, in the alternative, be masked by pseudorandom two-dimensional translational displacement of individual glyphs from a nominal glyph center pattern.

In accordance with one embodiment of the present invention, only a subset of the covertly marked glyphs are used to convey a covert code. For example, such a covert code may include an authenticity code, a digital signature, or a record numbering data, or the like. In one embodiment, less than all of the glyphs tagged with a covert code characteristic are used to convey the covertly marked code. Accordingly, decoding for this embodiment requires not only identification of marks having a covert code characteristic, but also identification of the subset of such marks that actually carry the covertly marked code. This identification is aided by the overtly marked code.

Figure 4:
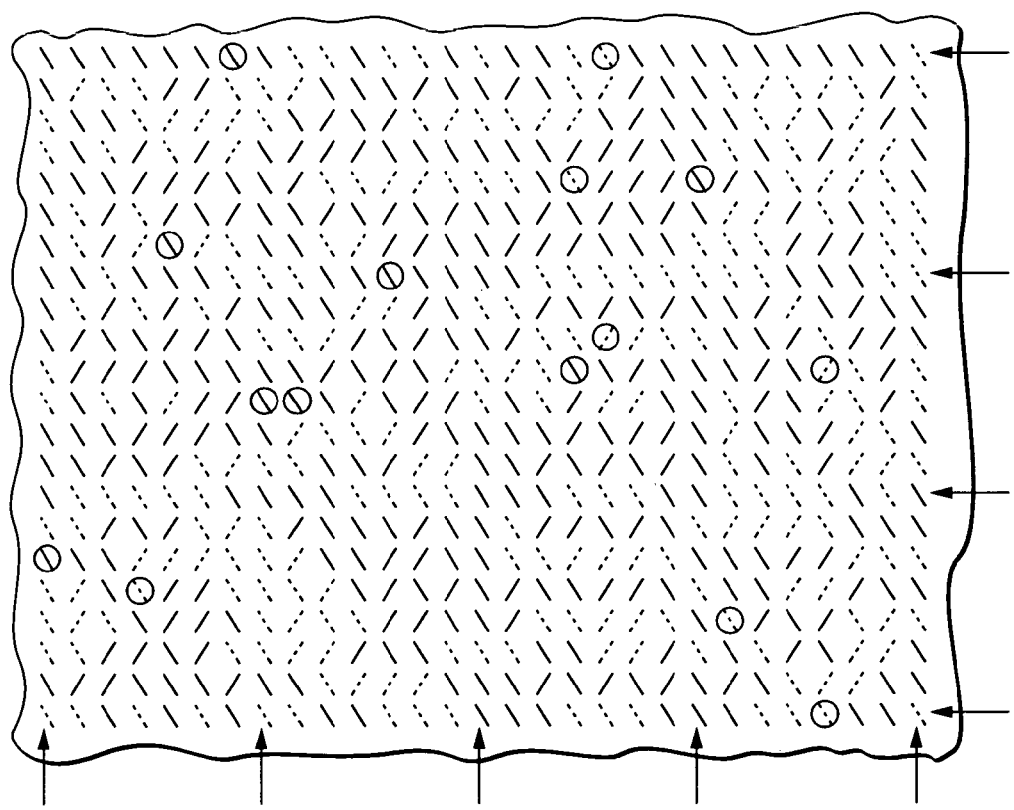
FIG. 4 shows a code similar to that of FIG. 3, with mixed data (0,1) rotation overt coding.

FIG. 4 shows a code similar to that of FIG. 3, with mixed data (0,1) rotation overt coding. Covert code glyphs are denoted by circles, instead of dots as in FIG. 3.

Accordingly, an approach has been disclosed which may be used to deter copying and counterfeiting of original printed documents so that they may be adequately trusted as authentic originals. Additional incorporated digital printed messages (plain text and/or encrypted and/or digital signature) can be authenticated as original printed entities and thereby distinguished from copies, counterfeits or forgeries. This is useful for document management information, including other authentication data such as data from a trusted printing management system, individual print number, usage rights, print owner, digital signature, private message, financial transaction record and the like.

Counterfeiting of dual characteristic covert glyph codes of the kind disclosed herein requires detection of the covert state of all or most of the glyphs in the counterfeit document or document portion, or requires breaking or stealing the digital encryption code, which can generally be made not practical using existing encryption security methods, as well as requiring access to the covert marking material and equipment for marking the covert states.

However, authentication can be accomplished with a test of relatively few specific glyphs, preferably checking for a similar number of glyphs in each covert state. As illustrated by the above example, authentication can be accomplished using less than or equal to N6 glyphs. The degree of difficulty in trying to reproduce or detect the covert state of each glyph can, therefore, be tailored by the selection of suitable covert encoding methodologies. Thus, robustness of foiling counterfeiting can be scaled from preventing casual copying on standard copies to glyph-by-glyph analytical testing.

The subject invention nevertheless provides the advantageous property of aesthetic appearance, which makes its use practical in many situations where as other marked patterns would be unacceptable.

The foregoing description of the invention has been presented for purposes of illustration and description. It is not exhaustive and does not limit the invention to the precise form disclosed. Modifications and variations are possible in light of the above teachings or may be acquired from practicing of the invention.

What is claimed is:

1. A record for marking encoded information comprising:
a marking medium;
first marks on said marking medium having a covert code characteristic, said first marks conveying a covertly marked code; said covert code characteristic including a feature of the covertly marked code that is visually undetectable by a human; and
second marks on said medium that convey an overtly marked code; said overtly marked code, when decoded, producing data for use in decoding said covertly marked code, wherein said second marks have an overt code characteristic indicating a feature of the overtly marked code that is visually detectable by a human as a state of a self-clocking glyph code.

2. A record of claim 1, wherein said covert code characteristic is a chemical taggant.

3. A record of claim 2, wherein said overt code characteristic is an optically visible state of a glyph.

4. A record of claim 1, wherein said first and second marks are self-clocking glyph codes.

5. A record of claim 1, wherein said covertly marked code, when decoded, produces authentication data.

6. A record of claim 1, wherein said first marks are comprised of a first and a second set of marks, and only said second set of marks convey said covertly marked code.

7. A record of claim 6, wherein said overtly marked code identifies the location of said second set of marks.

8. A record of claim 1, wherein said second marks include at least a subset of said first marks.

9. A record of claim 1, wherein the data produced for use in decoding said covertly marked code includes a location of the first marks on the encoded record.

10. A record of claim 1, wherein the data produced for use in decoding said covertly marked code includes information about how the covertly marked code was encoded on the record.

11. A record of claim 1, wherein said covertly marked code, when decoded, produces an encrypted message.

12. A record of claim 1, wherein said first and second marks at least in part comprise the same marks, with said same marks having both a visibly undetectable covert code characteristic and a visibly detectable overt code characteristic.

13. A record of claim 1, wherein said covert code characteristic of said first marks is visibly undetectable.

14. A record of claim 1, wherein said covert code characteristic of said first marks does not effect the appearance of said first and second marks.

15. A record of claim 1, further including third marks storing at least a portion of said encoded information, said third marks being distributed among said first and second marks.

16. A method for marking encoded information on a marking medium comprising the steps of:
placing first marks on said medium having a covert code characteristic, said first marks conveying a covertly marked code; said covert code characteristic including a feature of the covertly marked code that is visually undetectable by a human; and
placing second marks on said medium adapted to convey an overtly marked code; said overtly marked code, when decoded, producing data for use in decoding said covertly marked code, wherein second marks have an overt code characteristic indicating a feature of the overtly marked code that is visually detectable by a human as a state of a self-clocking glyph code.

17. A method of claim 16, wherein said second marks include at least a subset of said first marks.

18. A method of claim 16, wherein said covert code characteristic is a chemical taggant.

19. A record of claim 18, wherein said overt code characteristic is an optically visible state of a glyph.

20. A method of claim 16, wherein said first and second marks are self-clocking glyph codes.

21. A method of claim 16, wherein said first marks are comprised of a first and a second set of marks and only said second set of marks convey said covertly marked code.

22. A method of claim 21, wherein said overtly marked code identifies the location of said second set of marks.

23. A method of claim 16, wherein said covertly marked code, when decoded, produces authentication data.

24. A method of claim 16, wherein the first and second marks are applied via tri-level xerography.

25. A method of claim 16, wherein the data produced for use in decoding said covertly marked code includes a location of the first marks on the encoded record.

26. A method of claim 16, wherein the data produced for use in decoding said covertly marked code includes information about how the covertly marked code was encoded on the record.

27. A method of claim 16, wherein said covertly marked code, when decoded, produces an encrypted message.

28. A method of claim 16, wherein said covert code characteristic of said first marks is visibly undetectable.

29. A method of claim 16, wherein said covert code characteristic of said first marks does not effect the appearance of said first and second marks.

30. A method of claim 16, wherein said first and second marks at least in part comprise the same marks, with said same marks having both a visible undetectable covert code characteristic and a visibly detectable overt code characteristic.

* * * * *